(12) United States Patent
Gokan et al.

(10) Patent No.: US 6,708,634 B2
(45) Date of Patent: Mar. 23, 2004

(54) OUTPUT POWER SHAFT STRUCTURE FOR PERSONAL WATERCRAFT

(75) Inventors: Yoshitsugu Gokan, Saitama (JP); Tomohiro Fuse, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/193,304

(22) Filed: Jul. 12, 2002

(65) Prior Publication Data

US 2003/0015128 A1 Jan. 23, 2003

(30) Foreign Application Priority Data

Jul. 19, 2001 (JP) ........................................ 2001-219325

(51) Int. Cl.[7] .............................................. B63B 35/73
(52) U.S. Cl. ...................................... 114/55.5; 440/83
(58) Field of Search ........................... 114/55.5; 440/83, 440/111

(56) References Cited

U.S. PATENT DOCUMENTS 6,475,046 B2 * 11/2002 Muramatsu et al. ...... 440/88 R

FOREIGN PATENT DOCUMENTS

| JP | 04081389 A | * 3/1992 | ........... B63H/23/02 |
|---|---|---|---|
| JP | 2880691 | 1/1999 | |

* cited by examiner

Primary Examiner—Jesus D. Sotelo
(74) Attorney, Agent, or Firm—Birch, Stewart, Kolasch & Birch, LLP

(57) ABSTRACT

To provide an output power shaft structure for a personal watercraft which is superior in durability. A shaft of a propulsion device is connected to a rear end of a crankshaft of an engine, which is carried on a watercraft body such that the crankshaft thereof is directed in a longitudinal direction of the watercraft body, on an extension line of the crankshaft. A rear end of the crankshaft is disposed in an engine case, and an output power shaft separate from the crankshaft is connected to the rear end of the crankshaft. The shaft of the propulsion device is connected to a rear end of the output power shaft. The rear end of the crankshaft and a front end of the output power shaft are connected to each other in a transmission chamber in which a transmission mechanism for transmitting power of the crankshaft to a camshaft is provided at a rear portion of the crankshaft. A driving sprocket wheel of the transmission mechanism is provided on the output power shaft.

20 Claims, 11 Drawing Sheets

OUTPUT POWER SHAFT STRUCTURE FOR PERSONAL WATERCRAFT

CROSS-REFERENCE TO RELATED APPLICATIONS

This nonprovisional application claims priority under 35 U.S.C. §119(a) on patent application Ser. No. 2001-219325 filed in Japan on Jul. 19, 2001, the entirety of which is hereby incorporated by reference.

BACKGROUND OF THE INVENTION

1. Field of the Invention

This invention relates to an output power shaft structure for a personal watercraft.

2. Description of Background Art

Conventionally, the power source of a widespread personal watercraft is a 2-cycle engine. However, in order to achieve a reduction of public nuisance and reduction of noise in recent years, a personal watercraft which uses a 4-cycle engine as its power source has been proposed (Japanese Patent No. 2880691).

In the personal watercraft mentioned above, as shown in FIG. 11 of the present invention, an engine 1 is carried on a watercraft body 2 such that a crankshaft 1a thereof is directed in a longitudinal direction of the watercraft body 2. A shaft 3a of a propulsion device 3 (for example, a jet pump) is coupled to a rear end of the crankshaft 1a on an extension line of the crankshaft 1a by means of a coupling 4. Accordingly, power of the crankshaft of the engine 1 is transmitted to the propulsion device 3 through the shaft 3a of the propulsion device 3. The watercraft body 2 is propelled by the propulsion device 3.

In the personal watercraft having such a configuration as described above, a reactive force from the propulsion device 3 is transmitted to the crankshaft 1a of the engine 1. In particular, the crankshaft 1a is acted upon, via the coupling 4 through the shaft 3a of the propulsion device 3, by a countertorque, thrust force, bending force (force tending to deflect the crankshaft) and vibrations. Such forces as just mentioned act in a complicated combination upon the crankshaft 1a.

The conventional personal watercraft described above is structured such that a rear end 1b of the crankshaft 1a is projected to the outside of the engine case and the shaft 3a of the propulsion device 3 is connected to the rear end 1b of the crankshaft 1a through the coupling 4. Accordingly, the engine 1 has a length increased by a length over which the rear end 1b of the crankshaft 1a is projected to the outside of the engine case.

Therefore, when such a countertorque, thrust force, bending force and vibrations as mentioned above act in a complicated combination upon the crankshaft 1a, in the background art, the crankshaft 1a is likely to suffer from flexure (deflection), since the crankshaft 1a is longer. Since the crankshaft 1a rotates at a high speed, fatigue is likely to occur with the crankshaft 1a and a bearing portion of the crankshaft 1a. As a result, the durability of the engine can be degraded.

SUMMARY OF THE INVENTION

The object of the present invention resides in a solution to such a problem as described above, wherein an output power shaft structure for a personal watercraft is superior in durability.

In order to attain the object described above, according to a first aspect of the present invention, an output power shaft structure for a personal watercraft includes an engine carried on a watercraft body such that a crankshaft thereof is directed in a longitudinal direction of the watercraft body. A shaft of the propulsion device is connected to a rear end of the crankshaft of the engine on an extension line of the crankshaft. The shaft includes the rear end of the crankshaft disposed in an engine case. An output power shaft is separate from the crankshaft and is connected to the rear end of the crankshaft. The shaft of the propulsion device is connected to a rear end of the output power shaft.

According to the first aspect of the present invention, the rear end of the crankshaft is disposed in the engine case. Therefore, the crankshaft can be formed shorter that of the background art. Accordingly, even if a countertorque, thrust force, bending force and vibrations (as mentioned above) act in a complicated combination upon the crankshaft, the crankshaft is less likely to suffer from flexure (deflection), since the crankshaft is shorter. As a result, fatigue is less likely to occur with the crankshaft, which rotates at a high speed, and a bearing portion of the crankshaft. Accordingly, the durability of the engine is augmented.

According to a second aspect of the present invention, the engine is a 4-cycle OHC engine. A transmission chamber in which a transmission mechanism for transmitting power of the crankshaft to a camshaft of the engine is provided at a rear portion of the crankshaft of the 4-cycle OHC engine. The rear end of the crankshaft and a front end of the output power shaft are connected to each other in the transmission chamber. Accordingly, the rear end of the crankshaft and the front end of the output power shaft can be connected to each other making the most of the space in the transmission chamber.

According to a third aspect of the present invention, a driving sprocket wheel or a driving gear of the transmission mechanism is formed integrally on the output power shaft separate from the crankshaft. Accordinlgy, the driving sprocket or the driving gear of the transmission mechanism can be readily provided when compared with the driving sprocket or driving gear is provided on the crankshaft.

According to a fourth aspect of the present invention, a pulser rotor is formed integrally with the output power shaft separate from the crankshaft. Accordinlgy, the pulser rotor can be readily provided when compared with another case where the pulser rotor is provided on the crankshaft. In addition, a pulse can be extracted making the most of the space in the transmission chamber.

According to a fifth aspect of the present invention, a spline is formed on the rear end of the crankshaft and a front end of the output power shaft. The rear end of the crankshaft and the front end of the output power shaft are connected to each other through a connecting pipe having a spline for engaging with the splines formed on an inner face thereof. Accordingly, power from the crankshaft is transmitted with certainty to the output power shaft through the connecting pipe.

Although a countertorque, a bending force and vibrations from the shaft of the propulsion device are transmitted to the crankshaft through the connecting pipe, since the connection between the three members is established by the spline fitting, a reactive force from the shaft of the propulsion device, particularly a bending force and vibrations, are reduced significantly in the process wherein they are transmitted from the output power shaft to the connecting pipe and further to the crankshaft. Accordingly, with the output power shaft structure for a personal watercraft according to the fifth aspect of the present invention, the power from the crankshaft is transmitted with certainty to the output power shaft through the connecting pipe. Furthermore, the durability of the engine is further augmented.

According to a sixth aspect of the present invention, a gap is formed between opposing faces of the rear end of the crankshaft and the front end of the output power shaft. Accordingly, a countertorque, a thrust force, a bending force and vibrations transmitted from the shaft of the propulsion device to the crankshaft, particularly the thrust force and the bending force, are further reduced. As a result, the durability of the engine is further augmented with a higher degree of certainty.

According to a seventh aspect of the present invention, a driving sprocket wheel or a driving gear of the transmission mechanism is formed integrally on the connecting pipe. Accordingly, the driving sprocket wheel or the driving gear of the transmission mechanism can be provided readily when compared with another case where driving sprocket wheel or the driving gear is provided on the crankshaft.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 9(a) and 9(b) are views showing an output power shaft 22, wherein FIG. 9(a) is a rear view and FIG. 9(b) is a sectional view taken along line b—b of FIG. 9(a);

DETAILED DESCRIPTION OF THE PREFERRED EMBODIMENTS

In the following, an embodiment of the present invention will be described with reference to the accompanying drawings.

Figure 1:
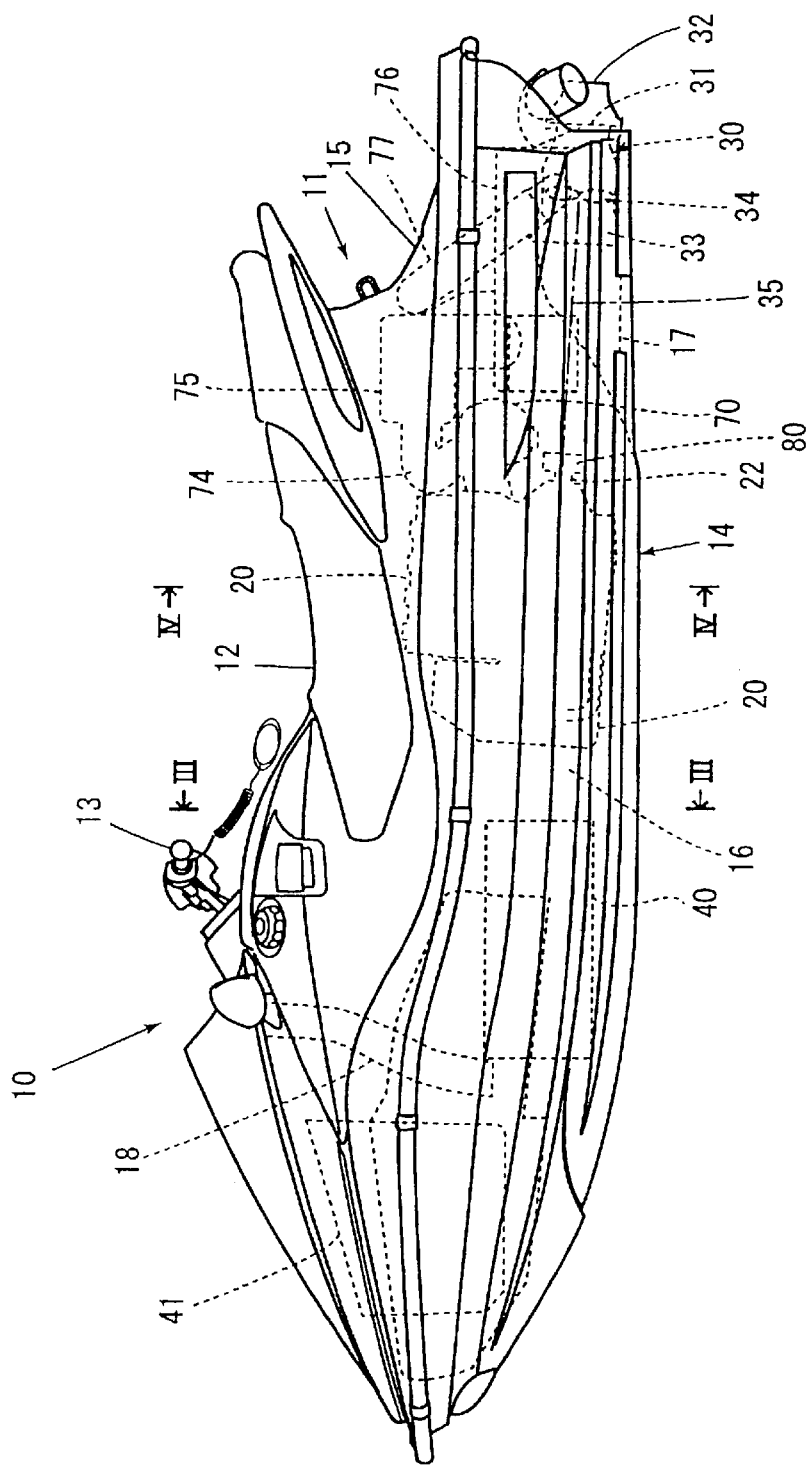
FIG. 1 is a schematic side elevational view illustrating an example of a personal watercraft in which an embodiment of an output power shaft structure for a personal watercraft according to the present invention is employed.
Figure 2:
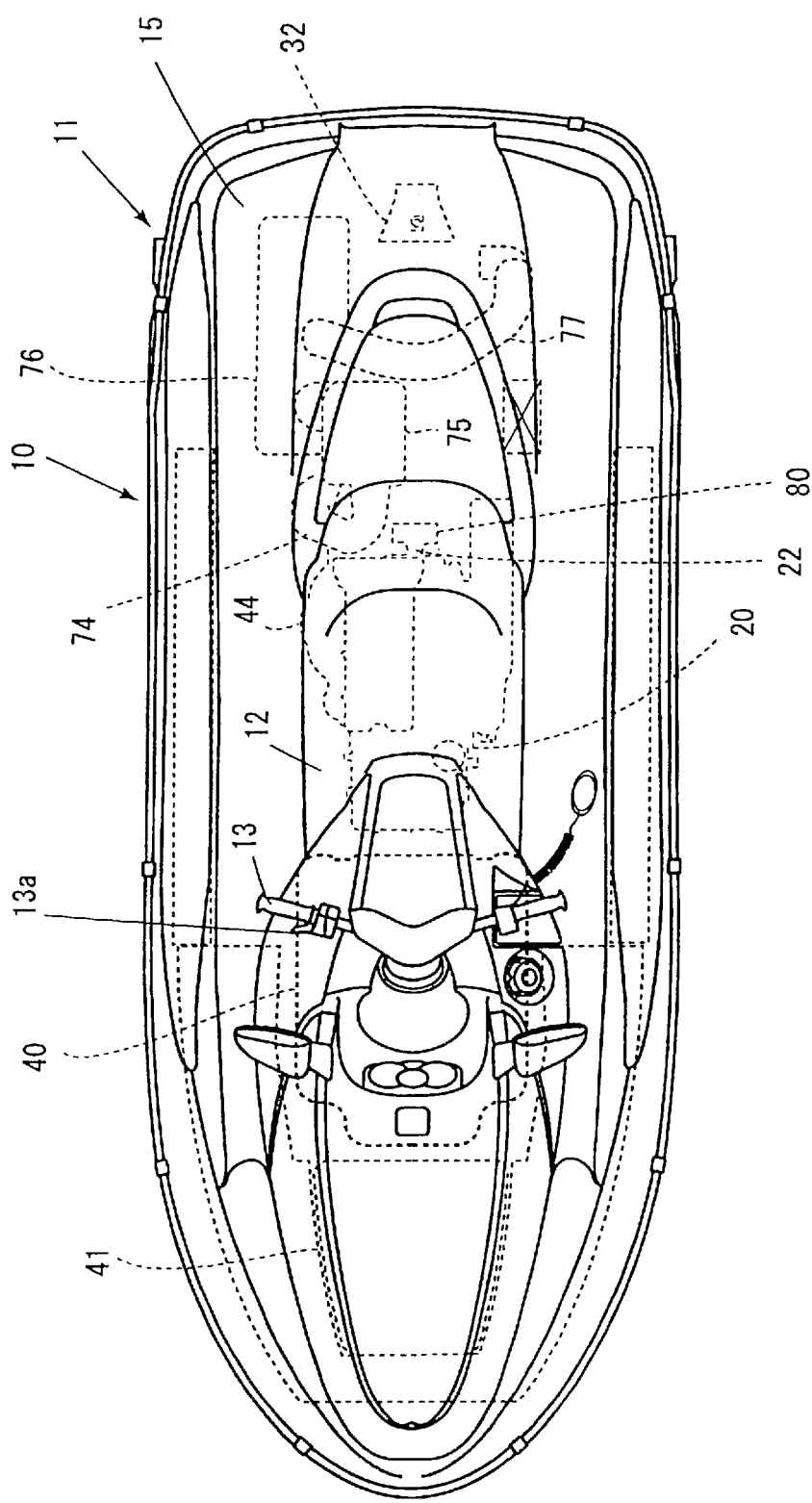
FIG. 2 is a plan view of FIG. 1.
Figure 3:
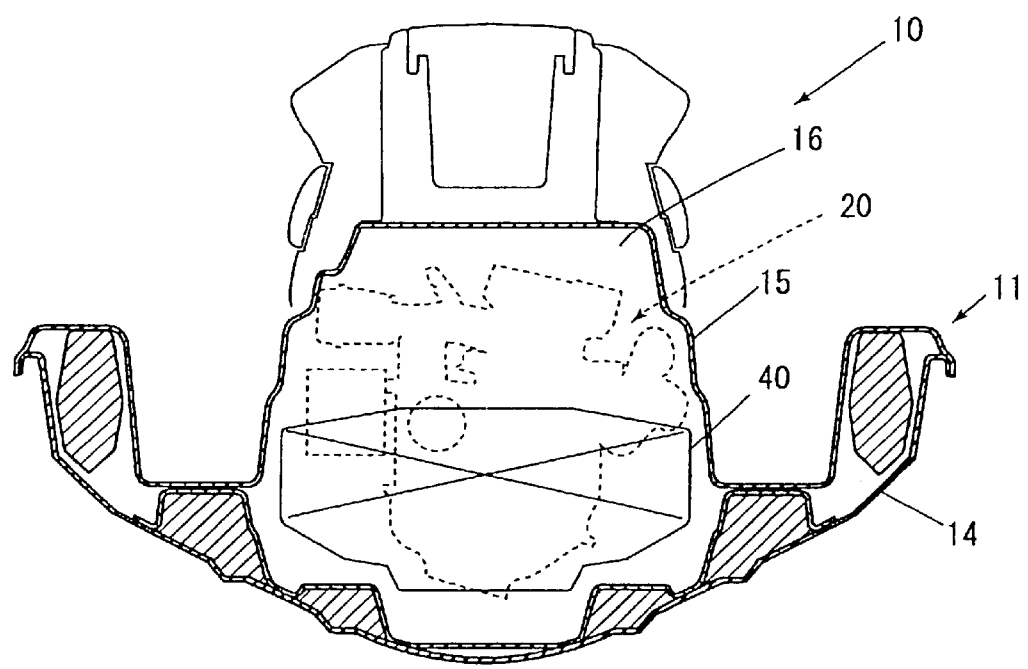
FIG. 3 is a partial enlarged sectional view (partly omitted sectional view) taken along line III—III of FIG. 1.

FIG. 1 is a schematic side elevational view showing an example of a personal watercraft which employs an embodiment of an output power shaft structure for a personal watercraft according to the present invention. FIG. 2 is a plan view of FIG. 1. FIG. 3 is a partial enlarged sectional view (partly omitted sectional view) taken along line III—III of FIG. 1.

As shown in the figures (principally in FIG. 1), the personal watercraft 10 is a small watercraft of the saddle type. A driver can sit on a seat 12 on a watercraft body 11 and grip a steering handle 13 with a throttle lever to steer the personal watercraft 10.

The watercraft body 11 has a floating body structure, wherein a hull 14 and a deck 15 are joined together such that a space 16 is formed in the inside thereof. In the space 16, an engine 20 is mounted on the hull 14 such that a crankshaft 21 (refer to FIG. 6) thereof is directed in a longitudinal direction of the watercraft body 11. A jet pump (jet propulsion pump) 30 as a propulsion device is driven by the engine 20 and is provided at a rear portion of the hull 14. An intake duct 18 for supplying intake air into the watercraft body (space 16) is provided on the watercraft body 11.

The jet pump 30 has a passage 33 extending from an intake 17 open to the watercraft bottom to a jet outlet 31 and a nozzle 32 open to the rear end of the watercraft body and an impeller 34 disposed in the passage 33. A shaft 35 of the impeller 34 is connected to an output power shaft 22, which is hereinafter described, of the engine 20 through a coupling 80. Accordingly, if the impeller 34 is driven to rotate by the engine 20, then water taken in from the intake 17 is jetted from the nozzle 32 through the jet outlet 31 so that the watercraft body 11 is propelled. The driving speed of the engine 20, i.e., the propelling force by the jet pump 30, is operated by a turning operation of a throttle lever 13a (refer to FIG. 2) of the steering handle 13 described above. The nozzle 32 is operatively associated with the steering handle 13 by an operation wire (not shown) such that it is pivoted by an operation of the steering handle 13. The advancing direction of the personal watercraft can be changed thereby. It should be noted that reference numeral 40 denotes a fuel tank, and 41 an accommodation chamber.

Figure 4:
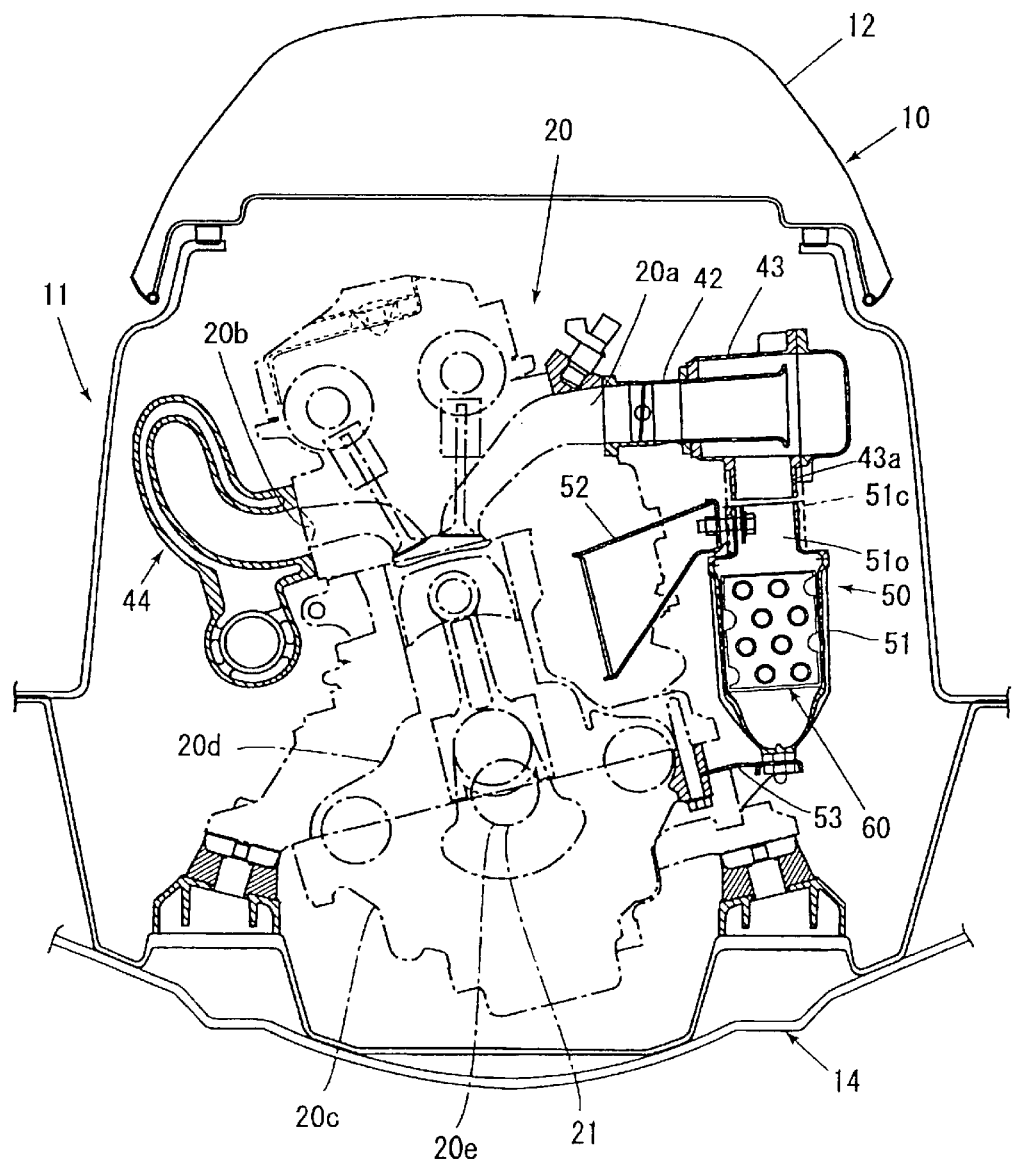
FIG. 4 is a view principally illustrating an engine 20 and is a partial enlarged sectional view (partly omitted sectional view) taken along line IV—IV of FIG. 1.
Figure 5:
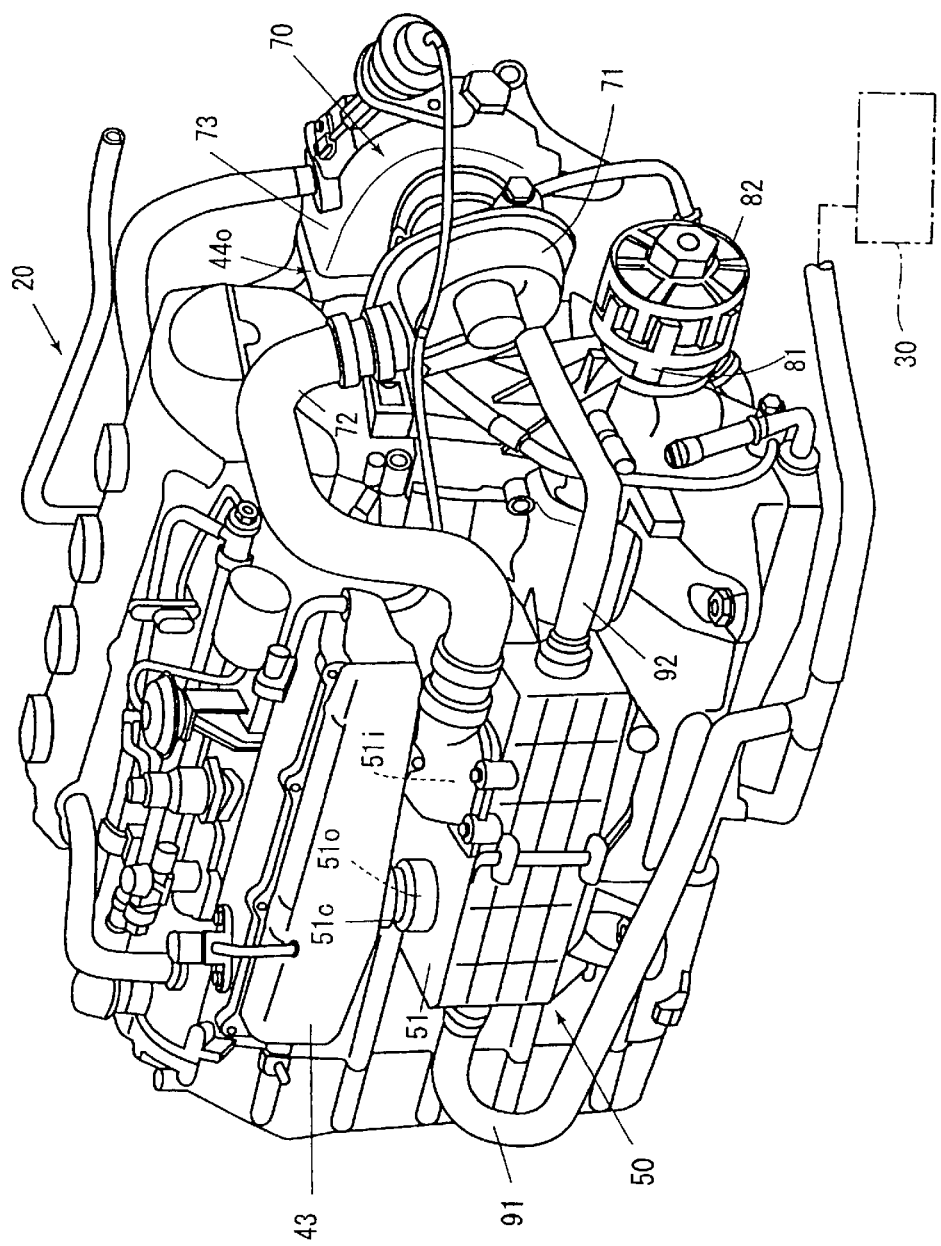
FIG. 5 is a schematic perspective view of the engine 20 as viewed from obliquely rearwardly.
Figure 6:
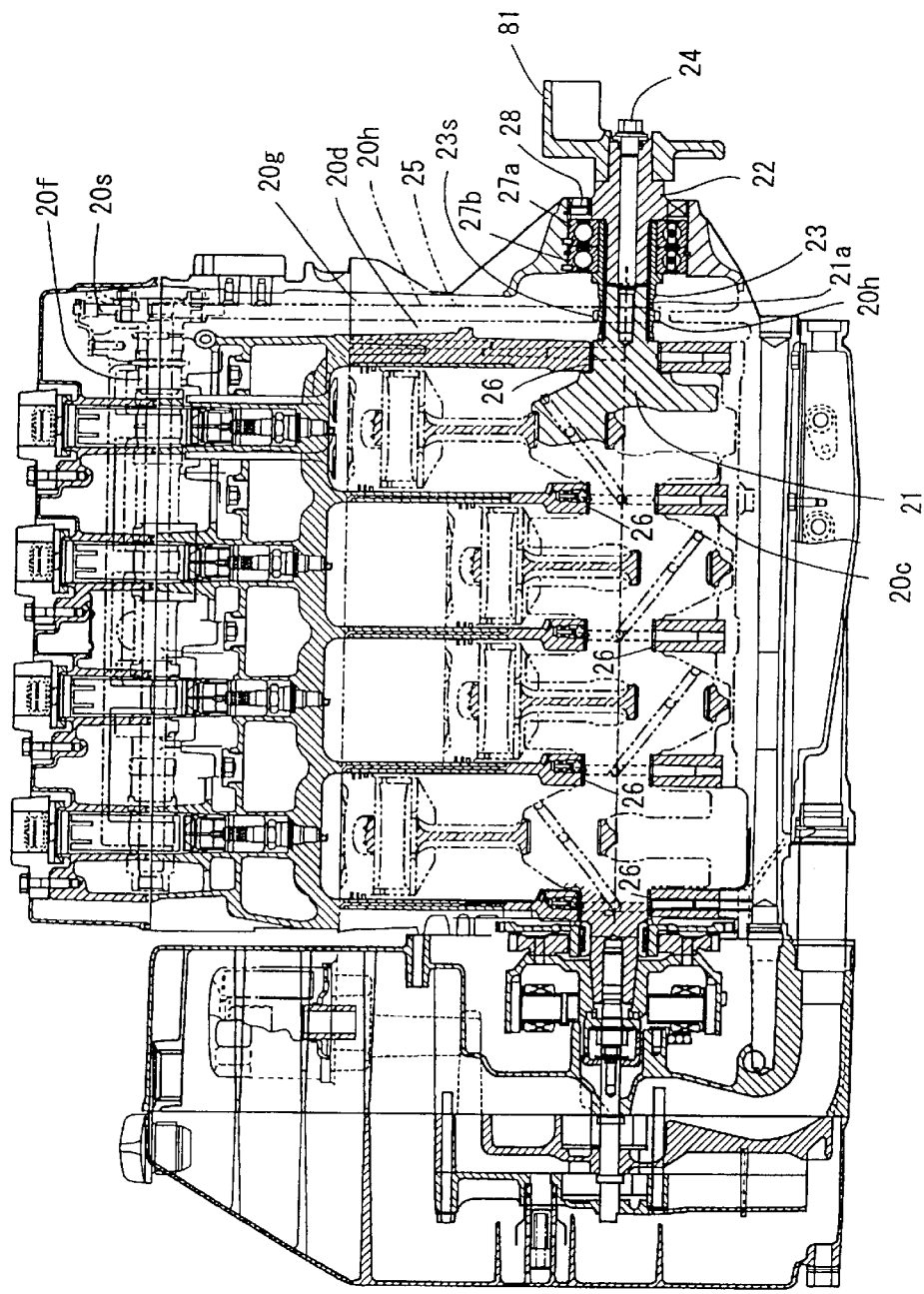
FIG. 6 is a side elevational sectional view of the engine 20.
Figure 7:
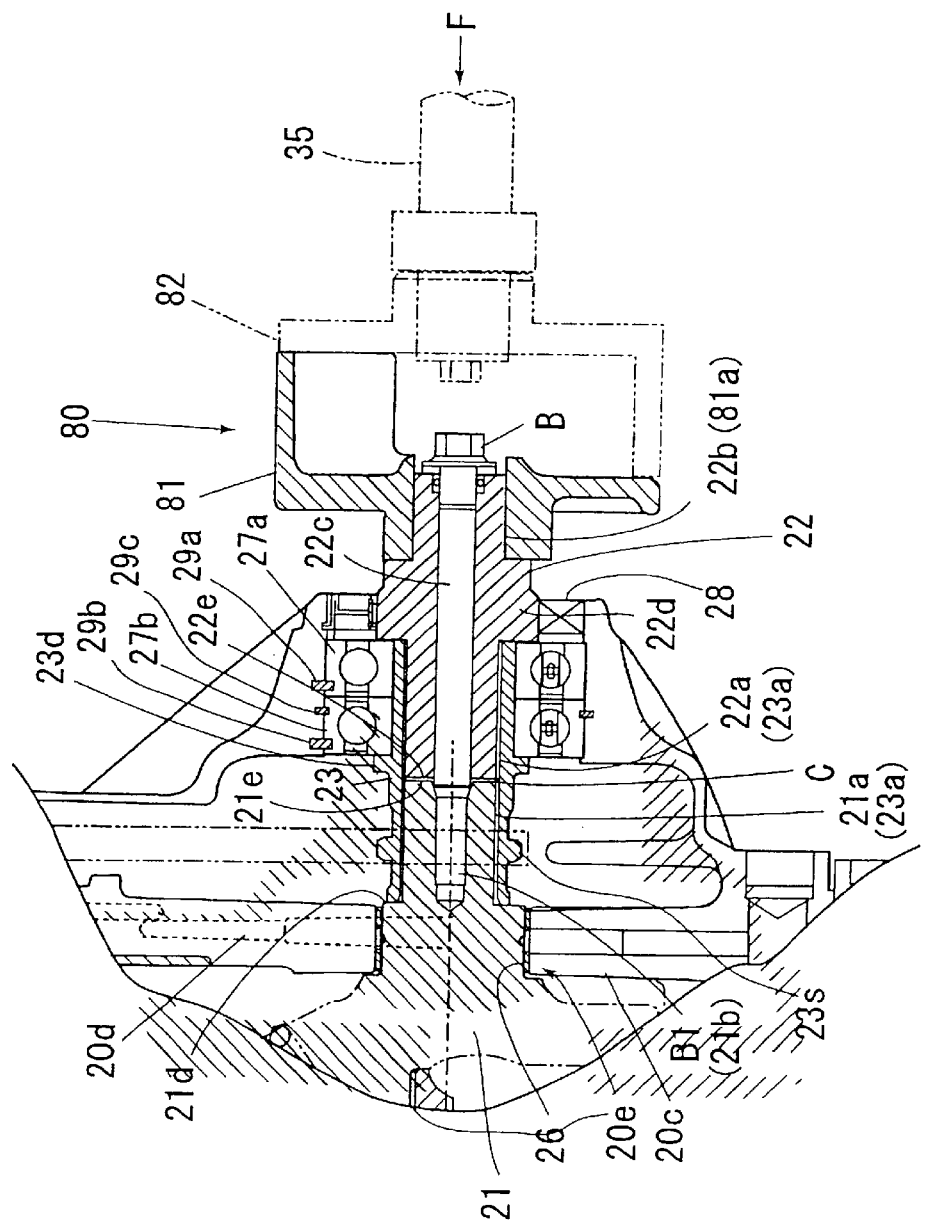
FIG. 7 is a partial enlarged view of FIG. 6.

FIG. 4 is a view principally showing the engine 20 and is a partial enlarged sectional view (partly omitted sectional view) taken along line IV—IV of FIG. 1. FIG. 5 is a schematic perspective view of the engine 20 as viewed from obliquely rearwardly. FIG. 6 is a side elevational sectional view. FIG. 7 is a partial enlarged view of FIG. 6.

The engine 20 is a DOHC in-line 4-cylinder 4-cycle engine and is disposed such that the crankshaft 21 thereof extends in the forward and backward direction of the body 11 as can be seen apparently from FIGS. 1 and 4. As shown in FIG. 4, an intake opening (intake port) 20a is disposed on the left side of the engine 20 with respect to the advancing direction of the watercraft body 11, and an exhaust opening (exhaust port) 20b is disposed on the right side of the engine 20.

A throttle body 42 and a surge tank (intake chamber) 43 are connected to the intake opening 20a. An intercooler 50 is connected to and disposed just below the surge tank 43. Reference numerals 52 and 53 denote mounting brackets for mounting the intercooler 50 on the engine 20.

As shown in FIGS. 4 and 5, the intercooler 50 includes a case 51 having an intake entrance 51i connected for communication by a pipe 72 to a compressor section 71 of a supercharger (turbocharger) 70 disposed immediately rearwardly of the engine 20 and an exit 51o connected to an intake entrance 43a of the surge tank 43 by a tube 51c. A cooling unit 60 is accommodated in the case 51 and serves as a heat exchanging unit. Referring to FIG. 5, reference numerals 91 and 92 denote cooling water hoses connected to the intercooler 50.

As shown in FIG. 4, an exhaust manifold 44 is provided at the exhaust opening 20b of the engine 20. An exhaust exit 44o (refer to FIG. 5) of the exhaust manifold 44 is connected to a turbine portion 73 of the supercharger 70.

It is to be noted that exhaust gas having rotated the turbine in the turbine portion 73 passes successively through an exhaust pipe 74, a back flow preventing chamber 75 for preventing backflow of water upon upsetting (admission of water into the supercharger 70 and so forth), a water muffler 76 and an exhaust-drainage pipe 77 and is discharged into a water stream formed by the jet pump 30 as seen in FIGS. 1 and 2.

As shown in FIGS. 6 and 7, the crankshaft 21 of the engine 20 is supported for rotation on a bearing portion 20e formed from a lower case 20c and an upper case 20d through plain metal 26. A rear end (21a) of the crankshaft 21 is disposed in an engine case (20c, 20d). An output power shaft 22 separate from the crankshaft 21 is connected to the rear end (21a). The shaft 35, which is a shaft of the jet pump 30 serving as the propulsion device described hereinabove, is connected to a rear end of the output power shaft 22 through a coupling 80.

The output power shaft 22 is supported for rotation by means of two anti-friction bearings 27a and 27b, which cannot move in a thrust direction (a leftward or rightward direction in FIGS. 6 and 7) on the engine case (20c, 20d). It is to be noted that reference numeral 28 denotes a seal member for preventing admission of water into the engine 20, and reference characters 29a, 29b and 29c each denote a thrust receiving member interposed between a ball bearing and the engine case.

Figure 8:
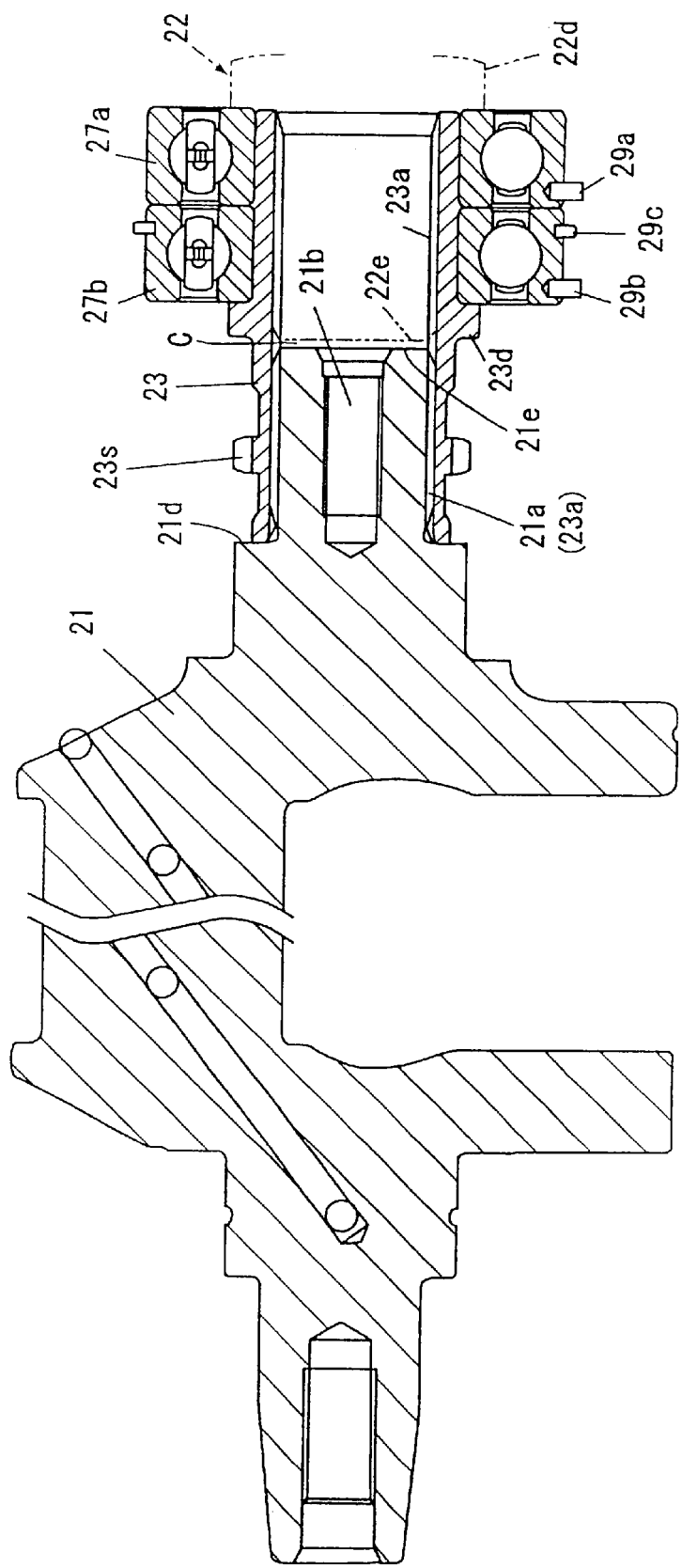
FIG. 8 is an enlarged view showing a crankshaft 21, a connecting pipe 23 and ball bearings 27a and 27b.
Figure 9A:
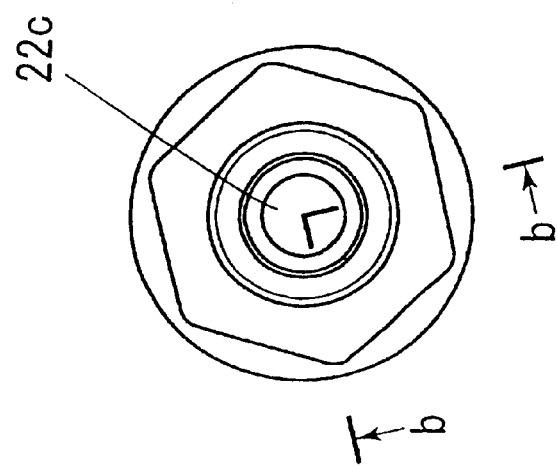
Figure 9B:
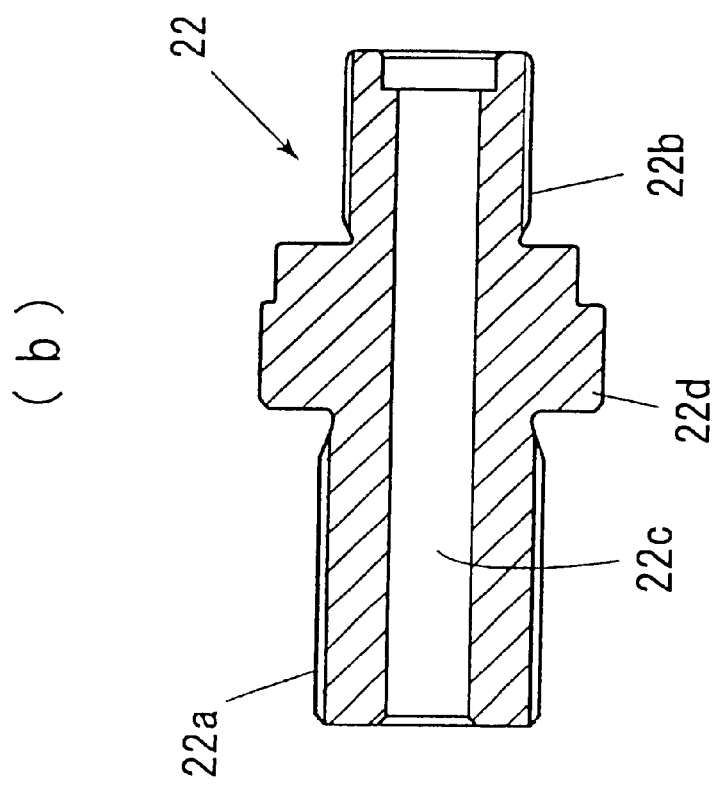

FIG. 8 is an enlarged view of the crankshaft 21, a connecting pipe 23 and the ball bearings 27a and 27b. FIG. 9(a) is a view from the rear of the output shaft 22 and FIG. 9(b) is a sectional view taken along line b—b of (a) of FIG. 9.

As shown in FIGS. 7 to 9, splines 21a and 22a are formed at a rear end of the crankshaft 21 and a front end of the output power shaft 22, respectively. The rear end of the crankshaft 21 and the front end of the output power shaft 22 are connected to each other by the connecting pipe 23 having formed on an inner face thereof a spline 23a for engaging with the splines 21a and 22a.

A spline 22b is also formed at a rear end of the output power shaft 22 and is held in engagement with a spline 81a formed on an inner face of a boss portion of an output side coupling 81 (refer to FIG. 7) to connect the output side coupling 81 to the rear end of the output power shaft 22. It should be noted that the shaft 35 is connected to the output side coupling 81 through a coupling 82 of the jet pump 30 side.

Attachment of the output power shaft 22, connecting pipe 23 and bearings 27a and 27b to the crankshaft 21 is performed in the following manner. In particular, the connecting pipe 23 and the bearings 27a and 27b are first attached to the crankshaft 21 as shown in FIG. 8. Then, as shown in FIG. 7, the output power shaft 22 is inserted into a rear portion of the connecting pipe 23, and a bolt B is inserted into a bolt insertion hole 22c (refer to FIG. 9) of the output power shaft 22 and the connecting pipe 23. Finally, a male threaded portion B1 formed at an end portion of the bolt B is screwed into a threaded hole 21b (refer to FIG. 8) formed at the rear end of the crankshaft 21. It should be noted that a threaded portion for engagement with the male threaded portion B1 of the bolt B is not formed on the output power shaft 22 (refer to FIG. 9). The bolt B is merely inserted in the output power shaft 22.

Thereafter, the lower case 20c and the upper case 20d of the engine 20 are fastened to each other by tightening bolts not shown. As a result, the crankshaft 21, output power shaft 22, connecting pipe 23 and bearings 27a and 27b are assembled to the engine 20 as shown in FIGS. 6 and 7.

In the state assembled in this manner, the connecting pipe 23 is held in a softly sandwiched state by and between an offset portion 21d at a rear portion of the crankshaft 21 and a flanged portion 22d of the output power shaft 22 in an axial direction of the connecting pipe 23 (softly to such a degree that the connecting pipe 23 is positioned without a play between the offset portion 21d at the rear portion of the crankshaft 21 and the flanged portion 22d of the output power shaft 22 in the axial direction of the connecting pipe 23). Furthermore, the bearings 27a and 27b are held in a state sandwiched softly by and between a flanged portion 23d of the connecting pipe 23 and the flanged portion 22d of the output power shaft 22 (softly in such a degree that the bearings 27a and 27b are positioned without a play between the flanged portion 23d of the connecting pipe 23 and the flanged portion 22d of the output power shaft 22). A gap C (refer to FIG. 8) is formed between opposing faces 21e and 22e of the rear end of the crankshaft 21 and the front end of the output power shaft 22.

Accordingly, a thrust force F (refer to FIG. 7) from the shaft 35 of the jet pump 30 is received principally by the bearings 27a and 27b (accordingly by the engine case) through the coupling 80 and the flanged portion 22d of the output power shaft 22, but does not act directly upon the crankshaft 21. Even if the thrust force F acts upon the crankshaft 21, it acts only a little indirectly (in a moderated state) through the connecting pipe 23.

As shown in FIGS. 6 and 7, a transmission chamber 20g in which a transmission mechanism (hereinafter described) for transmitting power of the crankshaft 21 to a camshaft 20f of the engine 20 is accommodated is provided at a rear portion of the engine 20, i.e., a rear portion of the crankshaft 21. The rear end (21a) of the crankshaft 21 and the front end (22a) of the output power shaft 22 are connected to each other in the transmission chamber 20g.

The transmission mechanism for transmitting power of the crankshaft 21 to the camshaft 20f of the engine 20 includes a driving sprocket wheel 23s (refer to FIG. 8) formed integrally on the connecting pipe 23, a driven sprocket wheel 20s provided on the camshaft 20f for rotation together with the camshaft 20f, and an endless chain (transmission chain) 20h extending between and around the driving sprocket wheel 23s and the driven sprocket wheel 20s. It should be noted that the transmission mechanism may otherwise be formed from a gear train. In the latter case, a driving gear is provided integrally on the connecting pipe 23 in place of the driving sprocket wheel 23s.

With the output power shaft structure for a personal watercraft having such a configuration as described above, the following operation and effects are achieved.

The output power shaft structure for a personal watercraft includes an engine 20 carried on a watercraft body 11 such that a crankshaft 21 thereof is directed in a longitudinal direction of the watercraft body 11. A shaft 35 of a propulsion device 30 is connected to a rear end of the crankshaft 21 of the engine 20 on an extension line of the crankshaft 21 and is structured such that the rear end of the crankshaft 21 is disposed in an engine case (20c, 20d). An output power shaft 22 separate from the crankshaft 21 is connected to the rear end of the crankshaft 21 and the shaft 35 of the propulsion device 30 is connected to a rear end of the output power shaft 22. Therefore, since the rear end of the crankshaft 21 is disposed in the engine case (20c, 20d), the crankshaft 21 can be formed shorter as much.

Accordingly, even if such a countertorque, thrust force, bending force and vibrations as mentioned hereinabove act in a complicated combination upon the crankshaft 21, the crankshaft 21 is less likely to suffer from flexure (deflection) since the crankshaft 21 is shorter. As a result, fatigue is less likely to occur with the crankshaft 21 which rotates at a high speed and a bearing portion 26 of the crankshaft 21. Furthermore, the durability of the engine 20 is augmented.

The output power shaft structure for a personal watercraft is structured such that the engine 20 is a 4-cycle OHC engine. A transmission chamber 20g in which a transmission mechanism for transmitting power of the crankshaft 21 to a camshaft 20f of the engine 20 is provided at a rear portion of the crankshaft 21 of the 4-cycle OHC engine and the rear end of the crankshaft 21 and a front end of the output power shaft 22 are connected to each other in the transmission chamber 20g. Consequently, the rear end of the crankshaft 21 and the front end of the output power shaft 22 can be connected to each other making the most of the space in the transmission chamber 20g.

A spline 21a, 22a is formed on the rear end of the crankshaft 21 and a front end of the output power shaft 22. The rear end of the crankshaft 21 and the front end of the output power shaft 22 are connected to each other through a connecting pipe 23 having a spline 23a for engaging with the splines 21a and 22a formed on an inner face thereof. Consequently, power from the crankshaft 21 is transmitted with certainty to the output power shaft 22 through the connecting pipe 23.

Although a countertorque, a bending force and vibrations from the shaft 35 of the propulsion device 30 are transmitted to the crankshaft 21 through the connecting pipe 23, since the connection between the three members is established by the spline fitting, force from the shaft 35 of the propulsion device 30, particularly bending force and vibrations, are reduced significantly in the process wherein they are transmitted from the output power shaft 22 to the connecting pipe 23 and further to the crankshaft 21.

Accordingly, with the output power shaft structure for a personal watercraft, an effect that power from the crankshaft 21 is transmitted with certainty to the output power shaft 22 through the connecting pipe 23 and also the durability of the engine 20 is further augmented simultaneously is obtained.

A gap C is formed between opposing faces 21e and 22e of the rear end of the crankshaft 21 and the front end of the output power shaft 22. Consequently, a countertorque, a thrust force, a bending force and vibrations transmitted from the shaft 35 of the propulsion device 30 to the crankshaft 21, particularly the thrust force and the bending force, are reduced remarkably. As a result, the durability of the engine 20 is further augmented with a higher degree of certainty.

A driving sprocket wheel 23s (or a driving gear) of the transmission mechanism is formed integrally on the connecting pipe 23. Consequently, the driving sprocket wheel 23s (or the driving gear) of the transmission mechanism can be provided readily when compared with another case wherein it is provided on the crankshaft 21.

In a structure wherein a crankshaft 21 is supported on a case (20c, 20d) of an engine 20 through plain metal 26, an output power shaft 22 separate from the crankshaft 21 is connected to a rear end of the crankshaft 21. A shaft 35 of the propulsion device 30 is connected to a rear end of the output power shaft 22. The output power shaft 22 is supported on the case (20c, 20d) of the engine 20 by means of anti-friction bearings 27a and 27b which cannot be moved in a thrust direction. Therefore, a thrust force F from the shaft 35 of the propulsion device 30 is received principally by the output power shaft 22 and the anti-friction bearings 27a and 27b, but does not act directly upon the crankshaft 21. Even if the thrust force F acts upon the crankshaft 21, it acts indirectly (in a moderated state).

Furthermore, since the output power shaft 22 separate from the crankshaft 21 is connected to the rear end of the crankshaft 21 and the shaft 35 of the propulsion device 30 is connected to the rear end of the output power shaft 22, also countertorque, bending force and vibrations from the shaft 35 of the propulsion device 30 do not act directly upon the crankshaft 21. Even if they act upon the crankshaft 21, they act indirectly (in a moderated state). Particularly, the bending force acting upon the crankshaft 21 is reduced significantly.

Accordingly, with the output power shaft structure for a personal watercraft, the fatigue of the plain metal 26 which supports the crankshaft 21 is reduced. As a result, the durability of the engine 20 is further augmented.

Figure 10:
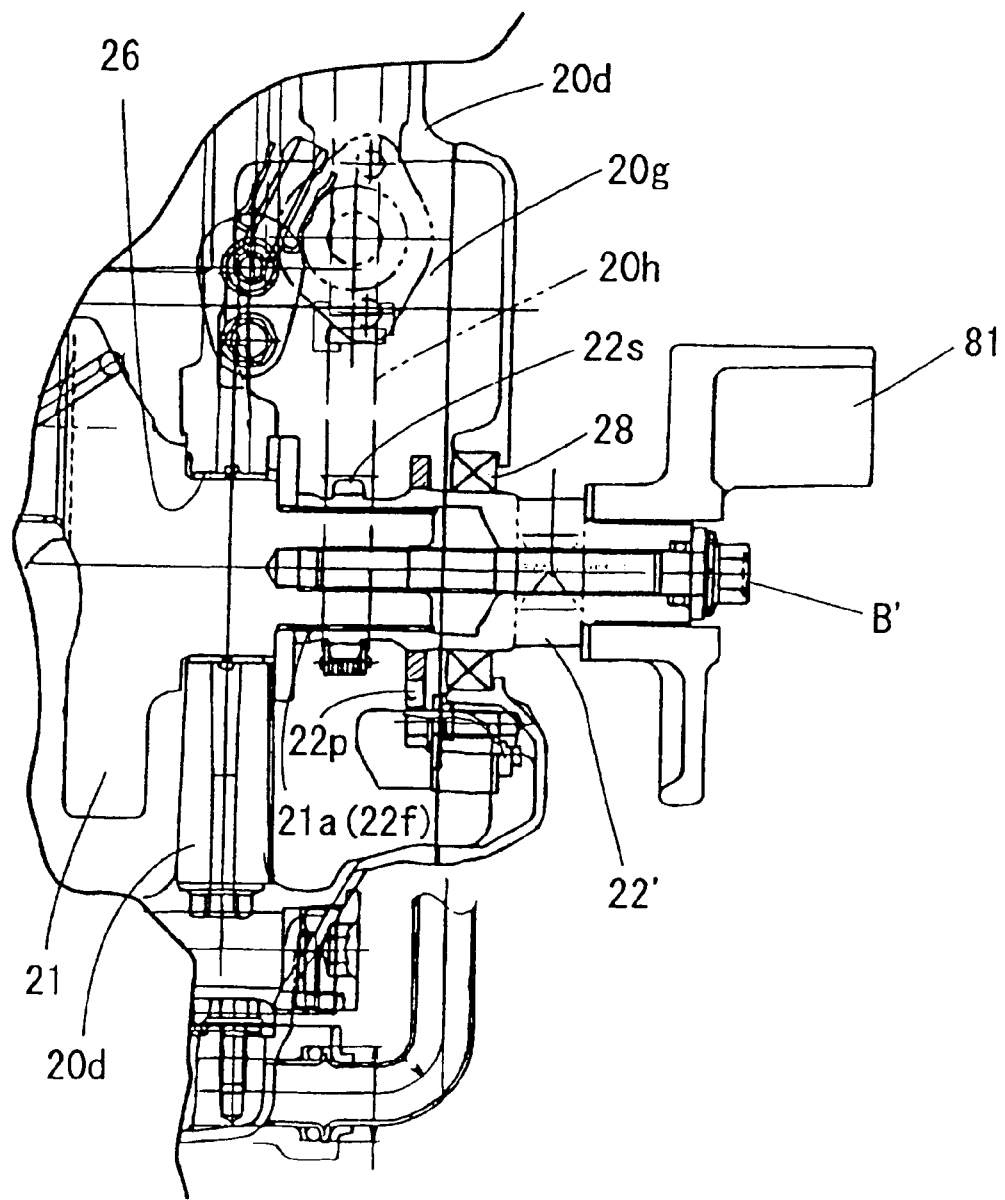
FIG. 10 is an enlarged sectional view of an essential part illustrating another embodiment of an output power shaft structure for a personal watercraft according to the present invention.
Figure 11A:
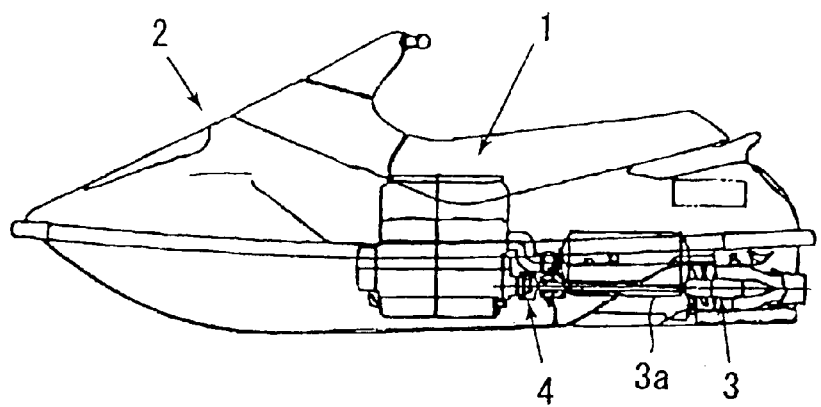
FIGS. 11(a) and 11(b) are explanatory views of the background art.
Figure 11B:
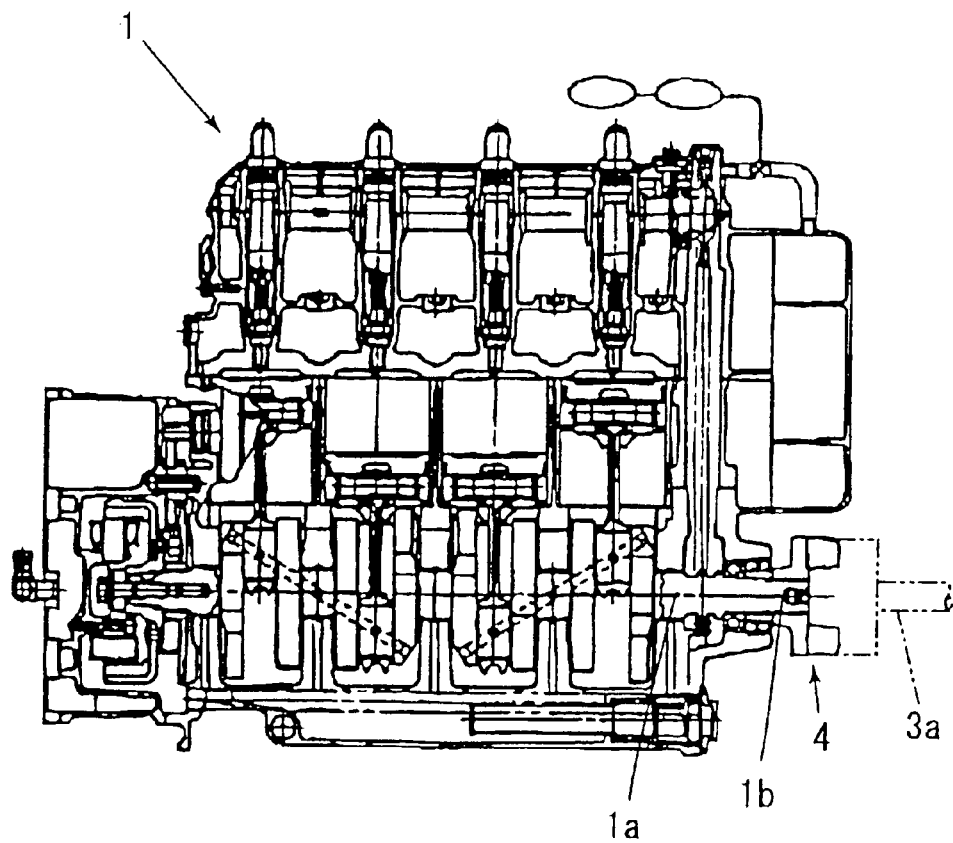

FIG. 10 is an enlarged sectional view of an essential part showing another embodiment of the output power shaft structure for a personal watercraft according to the present invention. In FIG. 10, like elements or corresponding elements to those of the embodiment described above are denoted by like reference characters. The present embodiment is different from the embodiment described hereinabove in that an output power shaft 22' is connected directly to the rear end of the crankshaft 21 without the intervention of the connecting pipe 23 and a driving sprocket wheel 22s and a pulser rotor 22p of the transmission mechanism are formed integrally on the output power shaft 22', but is common in the other part to the embodiment described hereinabove.

The output power shaft 22' has a cylindrical front portion and has a spline 22f formed on an inner circumference of the cylindrical front portion. The spline 22f is engaged with the spline 21a of the crankshaft 21, and the output power shaft 22' and the crankshaft 21 are connected to each other by a bolt B'.

Similarly as in the preceding embodiment, where the transmission mechanism is formed from a gear train, a driving gear is provided integrally on the output power shaft 22' in place of the driving sprocket wheel 22s.

Also with such an embodiment as just described, similar operation and effects to those given hereinabove can be achieved.

Furthermore, the driving sprocket wheel 22s (or driving gear) of the transmission mechanism is formed integrally on the output power shaft 22' separate from the crankshaft 21. Accordingly, it can be provided readily when compared with another case wherein the driving sprocket wheel 22s (or driving gear) of the transmission mechanism is provided on the crankshaft 21.

Furthermore, since the pulser rotor 22p is formed integrally on the output power shaft 22' separate from the crankshaft 21, it can be provided readily when compared with an alternative case wherein the pulser rotor 22p is provided on the crankshaft 21.

In addition, the space in the transmission chamber 22g described above can be made the most of to extract a pulse.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An output power shaft structure for a personal watercraft, wherein 4-cycle OHC engine is carried on a watercraft body such that a crankshaft thereof is directed in a longitudinal direction of the watercraft body and a shaft of a propulsion device is connected to a rear end of the crankshaft on an extension line of the crankshaft, said output power shaft structure comprising:

an output power shaft, said output power shaft being separate from the crankshaft and connected to the rear end of the crankshaft, wherein the rear end of the crankshaft is disposed in an engine case, and the shaft of the propulsion device is connected to a rear end of said output power shaft; and a transmission chamber in which a transmission mechanism for transmitting power of the crankshaft to a camshaft of the engine is provided at a rear portion of the crankshaft, and the rear end of the crankshaft and a front end of said output power shaft are connected to each other in the transmission chamber.

2. The output power shaft structure for a personal watercraft according to claim 1, wherein a driving sprocket wheel or a driving gear of the transmission mechanism is formed integrally on said output power shaft separate from the crankshaft.

3. The output power shaft structure for a personal watercraft according to claim 2, wherein a pulser rotor is formed integrally with said output power shaft separate from the crankshaft.

4. The output power shaft structure for a personal watercraft according to claim 1, wherein a pulser rotor is formed integrally with said output power shaft separate from the crankshaft.

5. The output power shaft structure for a personal watercraft according to claim 1, wherein a first spline is formed on the rear end of the crankshaft and a second spline is formed on a front end of said output power shaft, and the rear end of the crankshaft and the front end of said output power shaft are connected to each other through a connecting pipe having a third spline formed on an inner face thereof for engaging with the first and second splines.

6. The output power shaft structure for a personal watercraft according to claim 5, wherein a gap is formed between opposing faces of the rear end of the crankshaft and the front end of said output power shaft.

7. The output power shaft structure for a personal watercraft according to claim 5, wherein a driving sprocket wheel or a driving gear of the transmission mechanism is formed integrally on said connecting pipe.

8. The output power shaft structure for a personal watercraft according to claim 1, wherein a first spline is formed on the rear end of the crankshaft and a second spline is formed on a front end of said output power shaft, and the rear end of the crankshaft and the front end of said output power shaft are connected to each other through a connecting pipe having a third spline formed on an inner face thereof for engaging with the first and second splines.

9. The output power shaft structure for a personal watercraft according to claim 8, wherein a gap is formed between opposing faces of the rear end of the crankshaft and the front end of said output power shaft.

10. The output power shaft structure for a personal watercraft according to claim 8, wherein a driving sprocket wheel or a driving gear of the transmission mechanism is formed integrally on said connecting pipe.

11. A personal watercraft, comprising:

a watercraft body;

a 4-cycle OHC engine carried on said watercraft body, said engine including a crankshaft directed in a longitudinal direction of said watercraft body;

a propulsion device, said propulsion device including a shaft connected to a rear end of said crankshaft on an extension line of said crankshaft;

an output power shaft, said output power shaft being separate from said crankshaft and connected to the rear end of said crankshaft, wherein the rear end of said crankshaft is disposed in an engine case, and the shaft of said propulsion device is connected to a rear end of said output power shaft; and a transmission chamber in which a transmission mechanism for transmitting power of said crankshaft to a camshaft of said engine is provided at a rear portion of said crankshaft, and the rear end of said crankshaft and a front end of said output power shaft are connected to each other in the transmission chamber.

12. The personal watercraft according to claim 11, wherein a driving sprocket wheel or a driving gear of the transmission mechanism is formed integrally on said output power shaft separate from said crankshaft.

13. The personal watercraft according to claim 12, wherein a pulser rotor is formed integrally with said output power shaft separate from said crankshaft.

14. The personal watercraft according to claim 11, wherein a pulser rotor is formed integrally with said output power shaft separate from said crankshaft.

15. The personal watercraft according to claim 11, wherein a first spline is formed on the rear end of the crankshaft and a second spline is formed on a front end of said output power shaft, and the rear end of the crankshaft and the front end of said output power shaft are connected to each other through a connecting pipe having a third spline formed on an inner face thereof for engaging with the first and second splines.

16. The personal watercraft according to claim 15, wherein a gap is formed between opposing faces of the rear end of the crankshaft and the front end of said output power shaft.

17. The personal watercraft according to claim 15, wherein a driving sprocket wheel or a driving gear of the transmission mechanism is formed integrally on said connecting pipe.

18. The personal watercraft according to claim 11, wherein a first spline is formed on the rear end of the crankshaft and a second spline is formed on a front end of said output power shaft, and the rear end of the crankshaft and the front end of said output power shaft are connected to each other through a connecting pipe having a third spline formed on an inner face thereof for engaging with the first and second splines.

19. The personal watercraft according to claim 18, wherein a gap is formed between opposing faces of the rear end of the crankshaft and the front end of said output power shaft.

20. The personal watercraft according to claim 18, wherein a driving sprocket wheel or a driving gear of the transmission mechanism is formed integrally on said connecting pipe.

* * * * *